Figure 1:
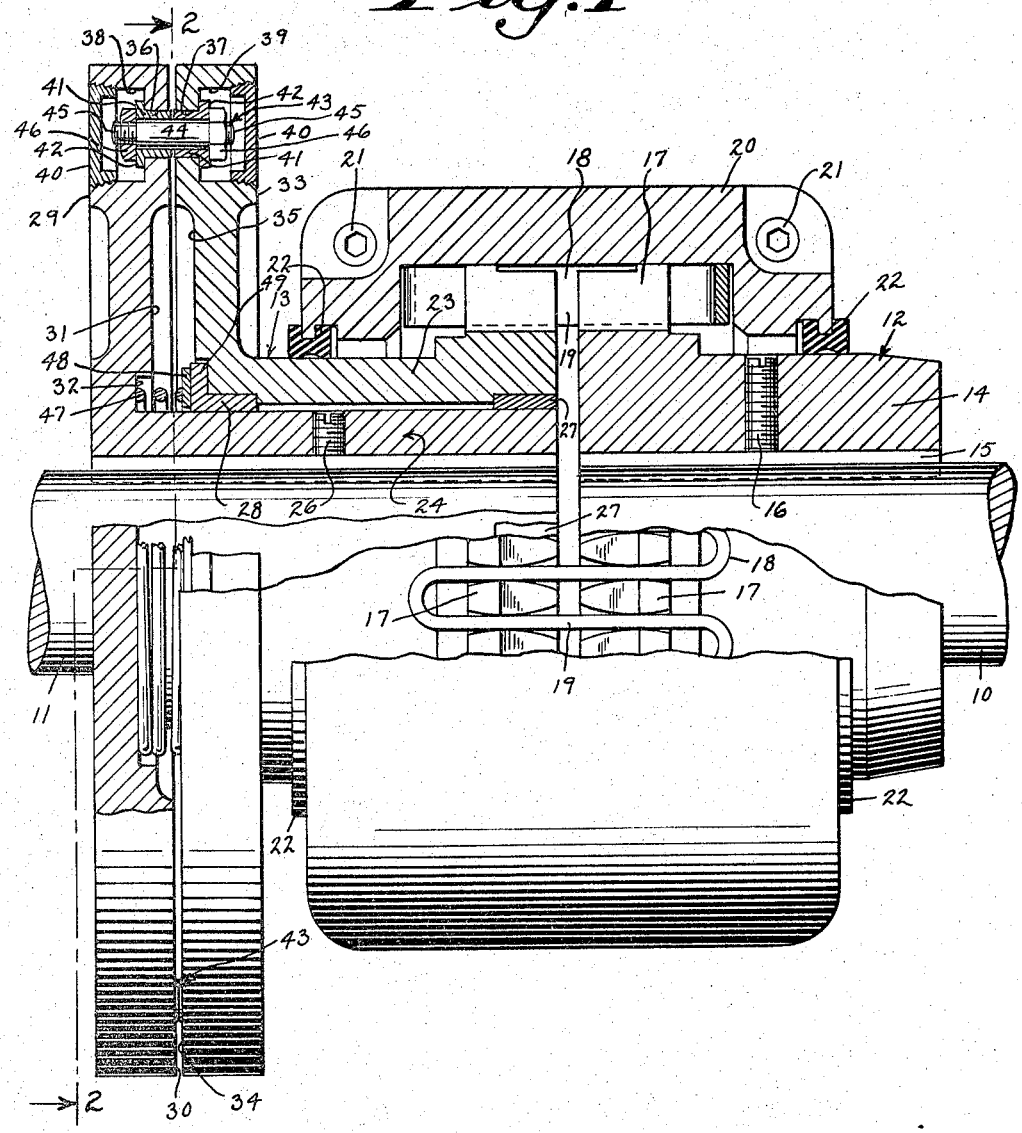
Figure 1:
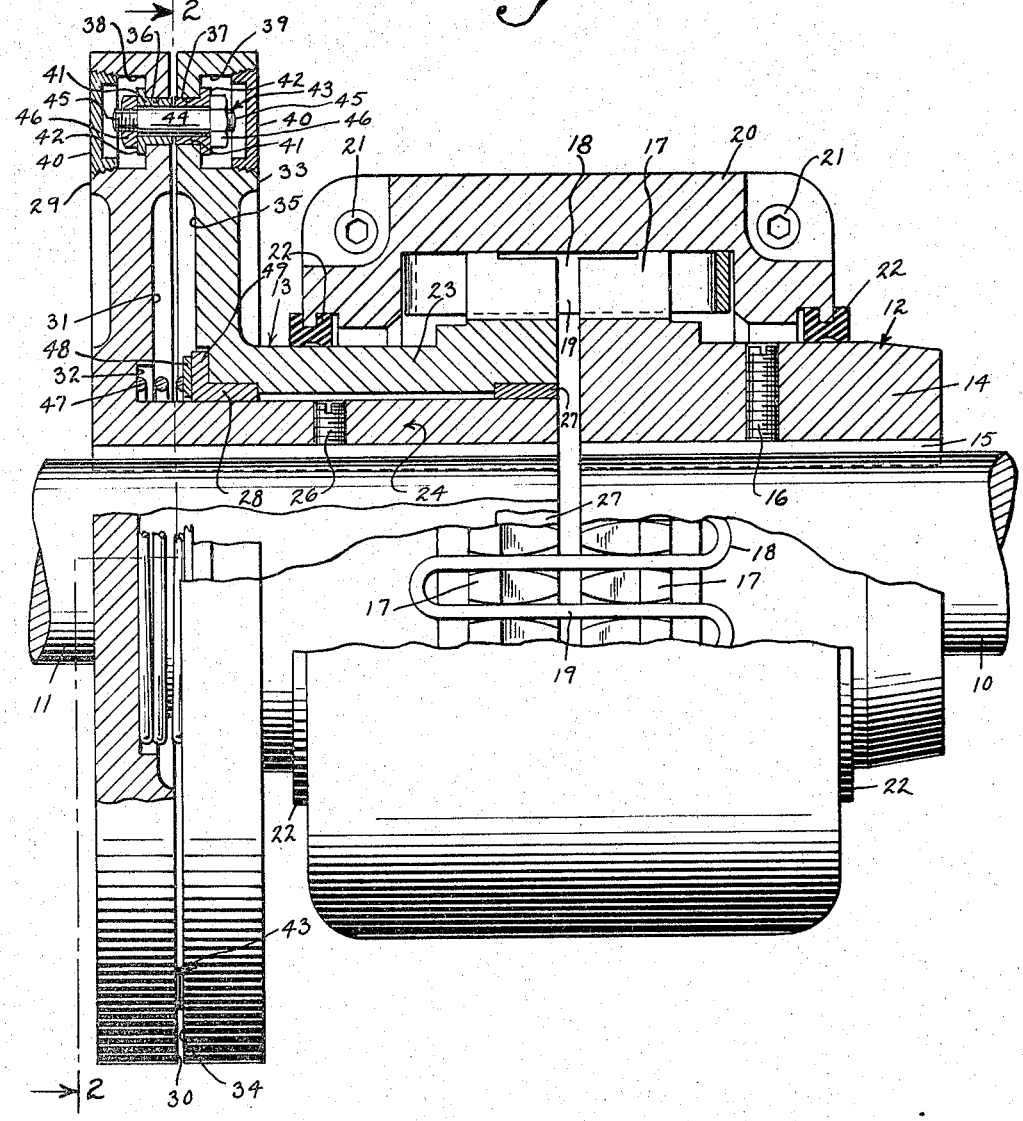

April 19, 1966  W. P. SCHMITTER  3,246,483
COUPLING

Filed Jan. 3, 1963  2 Sheets-Sheet 1

INVENTOR
WALTER P. SCHMITTER, DECEASED
BY A. LOUISE SCHMITTER
ROBERT V. ABENDROTH,
CO-EXECUTORS

BY Thomas W. Ehrmann

ATTORNEY

April 19, 1966 W. P. SCHMITTER 3,246,483
COUPLING

Filed Jan. 3, 1963 2 Sheets-Sheet 1

INVENTOR
WALTER P. SCHMITTER, DECEASED
BY A. LOUISE SCHMITTER
ROBERT V. ABENDROTH,
CO-EXECUTORS

BY Thomas W. Ehrmann

ATTORNEY 3,246,483
COUPLING
Walter P. Schmitter, deceased, late of Wauwatosa, Wis., by A. Louise Schmitter, Wauwatosa, Wis., and Robert V. Abendroth, Whitefish Bay, Wis., co-executors, assignors to The Falk Corporation, Milwaukee, Wis., a corporation of Wisconsin
Filed Jan. 3, 1963, Ser. No. 249,974
6 Claims. (Cl. 64—15)

This invention relates to power transmission couplings of the type which utilize shear elements that normally provide a torque transmitting connection between coupling elements associated with the coupled shafts but which are adapted to break when a preselected overload is applied to the coupling, and resides particularly in an improved coupling of this type in which damage to the coupling elements by the broken shear elements is prevented.

In certain applications of power transmission couplings connecting driving and driven shafts, such as in steel rolling mills and conveyors, the driven apparatus is likely to be jammed or stopped suddenly with a resulting overload which may damage the coupling and connected equipment. It is common in such applications to employ couplings which are provided with shear elements that are the weakest link in the coupling and drive. These shear elements are designed to break when a preselected overload is applied to the coupling so that sudden stoppage of the driven equipment, or other causes of extreme shock loads, will have the effect of breaking the shear element to relieve the load before failure of the coupling proper occurs.

The shear element has commonly taken the form of a replaceable pin which provides a torque transmitting connection between coupling elements operatively associated with the driving and driven shafts. While the ultimate function of the shear element is to limit damage to a relatively inexpensive replaceable element, the broken shear element may itself cause damage to the coupling. That is, the irregular broken surfaces which result from failure of the shear element may score or otherwise damage the coupling elements which it normally connects, particularly since the coupling elements are then free to rotate relative to each other. If such a result does occur, the shear element has not performed its purposes and the added cost of couplings which employ shear elements is wasted.

The improved coupling of this invention eliminates the possibility of damage to the coupling by the broken shear element. To this end, biasing means is provided which urges one of the coupling elements away from the other coupling element and the shear element not only provides a connection for the transmission of torque between the coupling elements but also restrains the coupling elements together against the force of the biasing means. Upon failure of the shear element, the now freed coupling element is shifted by the biasing means away from the other coupling element and clear of the broken ends of the shear element. Provision is also made for completely enclosing the shear element within the coupling so that upon failure the broken shear member will not fly out, while at the same time permitting ready access to the shear element for its replacement.

Accordingly, it an object of this invention to provide a power transmission coupling including a shear element adapted to be broken when a preselected overload is applied to the coupling and in which damage to the coupling by the broken shear element is prevented.

It is another object of this invention to provide a coupling of the type which includes breakable shear elements for overload protection with biasing means that forcibly shifts apart the coupling elements joined by the shear elements to prevent the broken shear elements from damaging the coupling.

It is a further object of this invention to provide such a coupling with shear elements that provide a torque transmitting connection between coupling elements and also holds such coupling elements together against the force of the biasing means.

It is also an object of this invention to provide a novel mounting for such shear elements which completely encloses the shear elements during operation of the coupling yet permits displacement of the shear elements after their failure and further permits ready access to the shear elements for their replacement.

The foregoing and other objects of this invention will appear in the description to follow. In the description, reference is made to the accompanying drawings which form a part hereof and in which there is shown by way of illustration a specific form in which this invention may be practiced. This form will be described in detail to enable those skilled in the art to practice this invention but it is to be understood that other embodiments of the invention may be used and that structural changes to the embodiment described may be made by those skilled in the art without departing from the true scope of the present invention. Consequently, the following detailed description is not to be taken in a limiting sense and the scope of the present invention is best defined by the appended claims.

Figure 2:
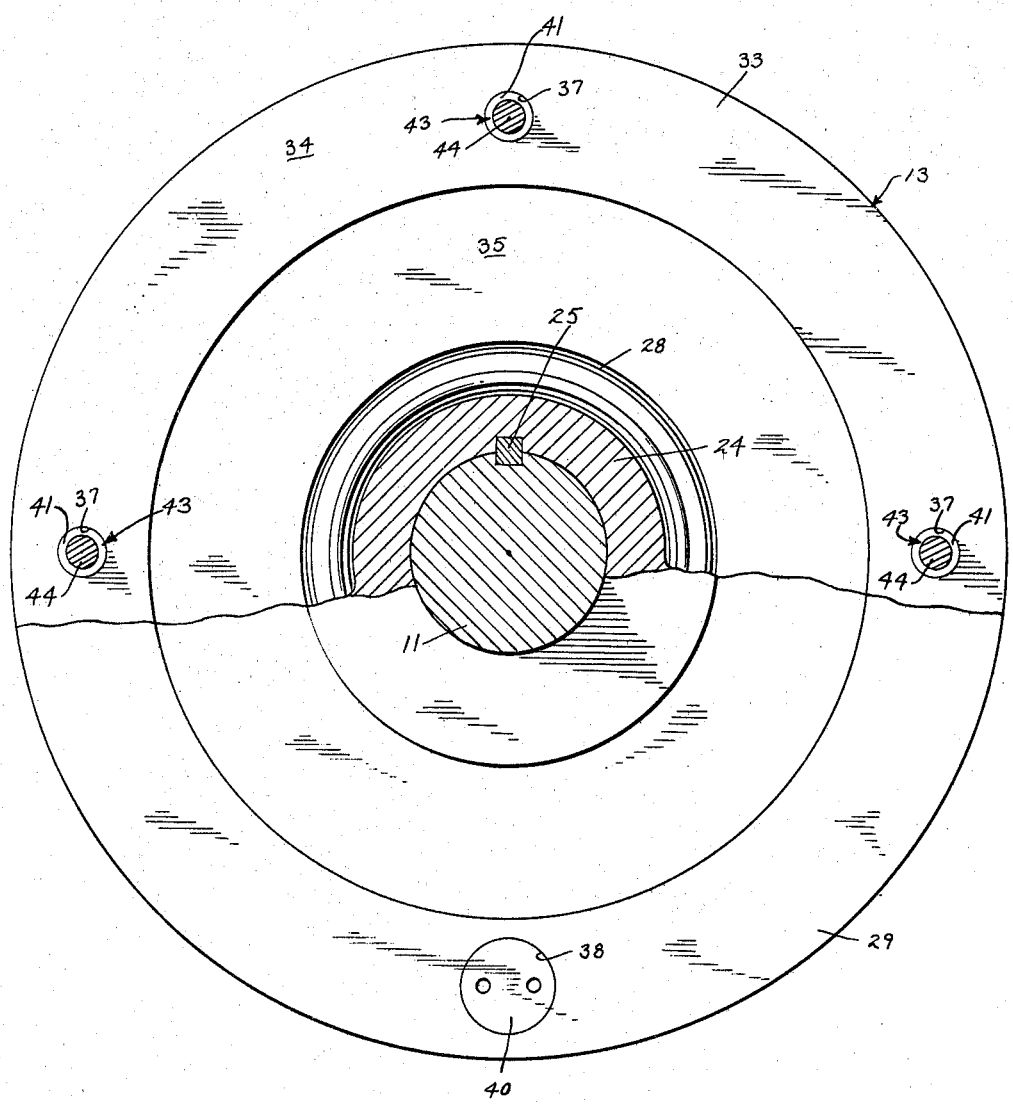

In the drawings:

FIG. 1 is a view in elevation and partly in section of a coupling in accordance with the teachings of this invention; and FIG. 2 is a view in elevation and partly in section taken in the plane represented by the line 2—2 in FIG. 1.

Referring to the drawings, the coupling is shown connecting driving and driven shafts 10 and 11. The coupling includes a pair of coupling members designated generally as 12 and 13 with a first coupling member 12 having a hub portion 14 surrounding the shaft 10 and which is secured to the shaft 10 for rotation therewith by a key 15 and is restrained from axial movement by a set screw 16. The second coupling member 13 is disposed concentrically of the shaft 11 in a spaced facing relation with the first coupling member 12, and both coupling members are provided, adjacent their inner ends, with a series of radially spaced, axially extending teeth 17. The coupling members 12 and 13 are torsionally connected by a resilient serpentine grid member 18 having rungs 19 which are slidably received within the slots between the teeth 17. The grid member 18 permits axial movement of the coupling members 12 and 13 within the limits of the end loops which connect the rungs 19. The operatively associated teeth 17 and grid member 18 comprise a flexible coupling of the type shown in the Schmitter Patent No. 2,181,537.

A suitable coupling cover is provided to prevent the entry of dust and grit to the teeth 17 and grid member 18 and also to act as a lubricant retainer housing. The cover comprises two similar semicircular cover members 20 which are joined at their radial splits by bolts 21, and the cover members 20 are seated on either side in split resilient sealing rings 22 disposed peripherally about the coupling members 12 and 13. The cover members 20 are loosely supported by both sets of teeth 17 so as to permit angular, lateral and axial displacement between the coupling members 12 and 13 to accommodate for shaft misalignment.

The second coupling member 13 includes a sleeve portion 23 journaled on a hub member 24 which surrounds the shaft 11 and is secured to the shaft 11 for rotation therewith by a key 25. The hub member 24 is restrained from axial movement by a set screw 26. Sleeve bearings 27 and 28 are fitted in accommodating recesses in the inner bore of the sleeve portion 23 to permit the second coupling member 13 to rotate relative to the hub member 24 and also to permit axial movement upon the hub member 24.

The hub member 24 includes an annular flange 29 which extends radially outward of the end of the hub member 24 remote from the shaft 10. The flange 29 has an inner face which is provided with a flat annular surface 30 adjacent its radially outward limits. The flat surface 30 is defined by a plane which is normal to the axis of the coupling. The inner face which includes the flat surface 30 is also provided with a recessed portion 31 disposed radially inward of the flat surface 30 and a further recessed annular seat 32 at the radially inwardmost limit of the flange 29. The second coupling member 13 is likewise provided with an annular flange 33 which extends radially outward of the end of the sleeve portion 23 adjacent the flange 29 of the hub member 24. As with the flange 29, one face of the flange 33 of the second coupling member 13 has a flat annular surface 34 and a recessed portion 35 radially inward of such surface 34. The flat surfaces 30 and 34 of the flanges 29 and 33, respectively, are adapted to confront each other with the recessed portions 31 and 35 cooperating to form a cavity between the flanges.

The flange 29 is provided with a plurality of radially spaced, axially directed openings 36 which are located at a common radial distance from the axis of the coupling and the flange 33 is provided with similarly located openings 37 which are adapted to register with the openings 36 in the flange 29 to provide a continuous opening through the two flanges 29 and 33 in the area of the respective flat surfaces 30 and 34. Counterbores 38 and 39 extend from the outer faces of the flanges 29 and 33 coaxial with the openings 36 and 37, respectively. The counterbores 38 are threaded to receive removable plugs 40 which, as shown in FIG. 2, are provided with means for manual removal such as the spanner wrench fittings illustrated.

Hardened steel bushings 41 are fitted within each of the openings 36 and 37 in the flanges 29 and 33 to the depth of collar portions 42. The bushings 41 preferably extend slightly beyond the flat surfaces 30 and 34. A shear member 43 is journaled through each pair of aligned bushings 41 and includes a circular cylindrical body portion 44 having a length which is slightly in excess of the combined length of the two bushings 41 and stud portions 45 of reduced diameter extend from either end of the body portion 44. Nuts 46 are threadedly received upon the stud portions 45 and against the shoulders defined by the ends of the larger body portion 44. The plugs 40 are internally dished to provide clearance for the ends of the stud portions 45.

A relatively stiff compression spring 47 is mounted concentrically about the hub member 24 with one end within the annular seat 32 and the other end bearing against a washer 48 which in turn bears against a collar portion 49 of the sleeve bearing 28. The spring 47 urges the second coupling member 13 axially toward the first coupling member 12 and away from the flange 29 of the hub member 24.

The shear members 43 provide a torque transmitting connection between the hub member 24 and the second coupling member 13 so that they will rotate in common and act as a unit. The shear members 43 with their attached nuts 46 also maintain the flanges 29 and 33 in adjacent relation against the force of the spring 47. Under the force of the spring 47, the nuts 46 will bear against the outer ends of the bushings 41. Since the body portion 44 is somewhat longer than the combined length of the bushings 41, the bushings 41 will be spaced slightly apart so that the load which can be transmitted between the hub member 24 and the second coupling member 13 will be governed solely by the size of the shear members 43 rather than being taken up in part by unaccountable friction forces.

The first coupling member 12 and the hub member 24 may each be mounted on either the driving or driven shaft. However, it is desirable to have the shock loads, which ultimately travel to the shear members 43, directed through the resilient grid member 18 so that such loads are dampened. The total cross sectional area of the shear members 43 is balanced in regard to the capacity of the teeth 17 and the grid member 18 so that failure upon overload will occur in the shear members 43 rather than in the teeth 17 or grid member 18.

When the coupling is loaded beyond the capacity of the shear members 43, the shear members 43 will break thereby disconnecting the second coupling member 13 and the hub member 24 and thereby removing the connection between the shafts 10 and 11.

The shear members 43 will not break in smooth regular fractures. If the flanges 29 and 33 were retained in their operating position adjacent each other, the jagged ends of the broken shear members 43 could score or otherwise mar the surfaces 30 and 34 as the then freed flanges 29 and 33 rotate relative to each other. In the coupling of the present invention, however, as soon as the shear members 43 fail, the compression spring 47 will shift the second coupling member 13 axially towards the first coupling member 12 within the limits of the coupling gap, defined by the opposing faces of the coupling members 12 and 13, to provide clearance for the broken ends of the shear members 43.

Since it is impossible to eliminate all bending stress from the shear members 43, failure of the shear members 43 may not occur along a plane normal to the axis of the coupling. Rather, the shear members may fail in a plane which is at an angle to their longitudinal axis with the result that broken edges of the shear members 43 may project considerably beyond the end of the bushings 41. The clearance between the ends of the stud portions 45 and the inner surfaces of the plugs 40 is provided to further insure that a failure of this type will not damage the coupling. That is, upon failure the two halves of each shear member 43 are permitted to move axially outwardly away from each other. The clearance on either end of the shear member 43 is preferably one-fourth to one-third of the diameter of the body portion 44 to allow for such "punch-back."

It will be appreciated from the above description that the coupling of this invention will not be damaged by broken shear members and that the damage due to overload is effectively limited to the inexpensive and replaceable shear members.

The invention claimed is:

1. A coupling for connecting driving and driven shafts, comprising: a pair of flexibly connected coupling members arranged in spaced facing relation, a first of said coupling members connectible to one of said shafts for rotation therewith and the second of said coupling members adapted to be disposed concentrically of the other of said shafts, said second coupling member being rotatable and axially movable relative to said other shaft; a hub member, connectible to said other shaft for rotation therewith; an axially disposed shear member normally connecting said second coupling member and said hub member for common rotation with said other shaft and restricting axial movement of said second coupling member, said shear member being adapted to be broken when a preselected overload is applied to the coupling; and biasing means operatively associated with said second coupling member and said hub member and adapted to shift said second coupling member axially relative to the hub member when said shear member is broken to thereby prevent damage to the coupling by the broken shear member.

2. A coupling for connecting driving and driven shafts, comprising: a pair of flexibly connected coupling members arranged in spaced facing relation, a first of said coupling members connectible to one of said shafts for rotation therewith and the second of said coupling members adapted to be disposed concentrically of the other said shafts, said second coupling member being rotatable and axially movable relative to said other shaft, said second coupling member including an annular flange having one face defined by a plane normal to the axis of the coupling; a hub member connectible to said other shaft for rotation therewith and including an annular flange having one face defined by a plane normal to the axis of the coupling and which is adapted to confront the like face of the flange of said second coupling member, said flanges having radially aligned, axially directed openings therethrough; a shear member journaled through the aligned openings in said flanges joining said hub member and said second coupling member for common rotation with said other shaft and restricting axial movement of said second coupling member, said shear member being adapted to be broken when a preselected overload is applied to the coupling; and biasing means operatively associated with said second coupling member and said hub member and adapted to shift said second coupling member axially relative to said hub member when said shear member is broken to thereby prevent damage to the flanges by the broken shear member.

3. A coupling for connecting driving and driven shafts, comprising: a hub member connectible to one of said shafts for rotation therewith and including an annular flange having one face defined by a plane normal to the axis of the coupling; a pair of coupling members arranged in spaced facing relationship, a first of said coupling members being connectible to the other of said shafts for rotation therewith and a second of said coupling members including a sleeve portion disposed concentrically about said hub member for rotation relative thereto and for axial movement thereon, said second coupling member further including an annular flange having one face defined by a plane normal to the axis of the coupling and adapted to confront the face of the flange of said hub member, said flanges each having a plurality of radially spaced, axially directed openings therethrough and which openings are aligned with the openings in the other flange; a shear member within each of the plurality of aligned openings joining said flanges for common rotation of said hub member and said second coupling member and restraining axial movement of said second coupling member, said shear members each being adapted to be broken when a preselected overload is applied to the coupling; means drivingly connecting the pair of coupling members while permitting relative axial movement of the coupling members; and biasing means between said hub member and said second coupling member to shift the flange of said second coupling member axially away from the flange of said hub member when the shear members are broken.

4. A coupling for connecting driving and driven shafts, comprising: a hub member connectible to one of said shafts for rotation therewith and including an annular flange extending radially outward at an end of the hub member remote from the other of said shafts, such flange having one face provided with a flat annular surface defined by a plane normal to the axis of the coupling and a recessed portion spaced radially inward of such flat surface; a pair of coupling members arranged in spaced facing relation, a first of said coupling members connectible to said other shaft for rotation therewith and a second of said coupling members including a sleeve portion disposed concentrically about said hub member for rotation relative thereto and for axial movement thereon, said second coupling member further including an annular flange extending radially outward from an end of said sleeve portion adjacent the flange of the hub member, such flange having one face provided with a flat annular surface defined by a plane normal to the axis of the coupling and adapted to confront the like face of the flange of the hub member, such face also having a recessed portion spaced radially inwardly of such flat surface and which recessed portion cooperates with the recessed portion of the flange of the hub member to define a cavity, said flanges each having a plurality of radially spaced, axially directed openings therethrough and which openings are aligned with the openings in the other flange; a shear member journaled within each of the plurality of aligned openings joining the flanges for common rotation of said hub member and said second coupling member and restraining axial movement of said second coupling member, said shear members being adapted to be broken when a preselected overload is applied to the coupling; means flexibly connecting the pair of coupling members while permitting relative axial movement of said coupling members; and a compression spring disposed concentrically about said hub member within said cavity between the hub member and the second coupling member and adapted to shift the second coupling member axially toward the first coupling member when said shear members are broken.

5. A coupling for connecting driving and driven shafts, comprising: a pair of flexibly connected coupling members arranged in spaced facing relation, a first of said coupling members connectible to one of said shafts for rotation therewith and a second of said coupling members adapted to be disposed concentrically of the other of said shafts, said second coupling member being rotatable and axially movable relative to said other shaft, said second coupling member including an annular flange having one face defined by a plane normal to the axis of the coupling; a hub member connectible to said other shaft for rotation therewith and including an annular flange having one face defined by a plane normal to the axis of the coupling and which is adapted to confront the like face of the flange of said second coupling member, said flanges each having a plurality of radially spaced, axially directed openings therethrough and which openings are aligned with the openings in the other flange, and each flange having a counterbore coaxial with each opening and extending inwardly from a second face; a bushing in each opening in each flange; a shear pin having a circular cylindrical body portion journaled through each pair of aligned bushings and joining the flanges for common rotation of said hub member and said second coupling member, each shear pin having a threaded stud portion of a reduced diameter extending from each end with a nut received on each of said threaded stud portions against the shoulder defined by the end of said body portion for restraining axial movement of said second coupling member, said shear members being adapted to be broken when a preselected overload is applied to said coupling; a removable plug threadingly received within each of the counterbores in each flange to enclose said shear members, the total length of each shear pin being substantially less than the distance between the opposing inner surfaces of said plugs; and biasing means operatively associated with said second coupling member and said hub member and adapted to shift said second coupling member axially away from the hub member when said shear members are broken.

6. A coupling for connecting driving and driven shafts, comprising: a hub member connectible to one of said shafts for rotation therewith and including an annular flange extending radially outward at an end of the hub member remote from the other of said shafts, such flange having one face defined by a plane normal to the axis of the coupling; a pair of coupling members arranged in spaced facing relationship and each having a plurality of axially extending and peripherally spaced teeth which define slots therebetween, a first of said coupling members connectible to said other shaft for rotation therewith and a second of said coupling members including a sleeve portion disposed coaxially about said hub member for rotation relative thereto and for axial movement thereon, said second coupling member further including an annular flange extending radially outward from an end of said sleeve portion adjacent the flange of the hub member, such flange having one face thereof defined by a plane normal to the axis of the coupling and adapted to confront the like face of the flange of the hub member, said flanges each having a plurality of radially spaced, axially directed openings therethrough and which openings are aligned with the openings in the other flange; a grid member slidably received within the slots in said coupling members to form a resilient torque transmitting element therebetween; a shear member within each of the plurality of aligned openings joining the flanges for common rotation of said hub member and said second coupling member and restraining axial movement of said second coupling member, said shear members being adapted to be broken when a preselected overload less than the capacity of said teeth and grid member is applied to the coupling; and biasing means between said hub member and said second coupling member and adapted to shift said second coupling member axially toward said first coupling member when said shear members are broken to prevent damage to said flanges by the broken shear members.

References Cited by the Examiner

UNITED STATES PATENTS

| | | | |
|---|---|---|---|
| 1,163,976 | 12/1915 | Arntzen et al. | 64—28 |
| 1,740,617 | 12/1929 | Morgan | 64—28 X |
| 1,978,209 | 10/1934 | Kuhns | 64—28 |
| 2,027,842 | 1/1936 | Schmitter et al. | 64—15 |
| 2,680,359 | 6/1954 | Bowers | 64—28 |
| 2,691,875 | 10/1954 | Schmitter | 64—28 |
| 2,727,371 | 12/1955 | Troeger et al. | 64—28 |

FOREIGN PATENTS

| | | |
|---|---|---|
| 112,372 | 1/1918 | Great Britain. |
| 381,403 | 10/1922 | Great Britain. |

BROUGHTON G. DURHAM, *Primary Examiner.*

CARL W. TOMLIN, *Examiner.*

I. B. TALTON, C. C. COE, *Assistant Examiners.*